United States Patent [19]
Bertram

[11] Patent Number: 5,790,118
[45] Date of Patent: Aug. 4, 1998

[54] MOBILE CLIENT PROGRAMMED TO HIDE EMPTY TABLE ELEMENTS

[75] Inventor: Randal Lee Bertram, Raleigh, N.C.

[73] Assignee: International Business Machines Corporation, Armonk, N.Y.

[21] Appl. No.: 813,521

[22] Filed: Mar. 7, 1997

[51] Int. Cl.⁶ .......................................... G06F 3/00
[52] U.S. Cl. .............................. 345/339; 395/769
[58] Field of Search ................... 395/764, 765, 395/768, 769, 770, 333, 334, 339

[56] References Cited

U.S. PATENT DOCUMENTS 5,337,405  8/1994  Lindauer et al. ................... 395/764
5,621,876  4/1997  Odam et al. ...................... 395/765

Primary Examiner—A. Katbab
Attorney, Agent, or Firm—Daniel E. McConnell

[57] ABSTRACT

A display system, particularly a computer such as a mobile client system, in which an empty element, cell or field of a displayed table is suppressed from being displayed until called for purposes of entry.

18 Claims, 10 Drawing Sheets

Candida Form

Main | Back

Candida Bloodstream Infections Multicenter Study

Center: 12
Date of birth: 04-29-54
Date of admission:
Primary ICD9

Hospital number: 123456789
Male ○  Female ○

| | First | Second | Third | Fourth |
|---|---|---|---|---|
| Date | 5/12/95 | 5/17/95 | 6/4/95 | |
| Minutes | 93 | 247 | 129 | |
| Type | Chest | Abdom | Chest | |
| Class | Clean | Clean | Clean | |

Record 1 of 6

Date of surgery
Minutes
ASA score

Anesthesia
Class: Clean-contaminated
Urgency

MOBILE CLIENT PROGRAMMED TO HIDE EMPTY TABLE ELEMENTS

RELATED APPLICATIONS

This application is one of a series of related applications assigned to common ownership. Other applications in the series include:

Application Ser. No. 08/781,004 filed 9. Jan. 1997 entitled "Mobile Client Computer with Keyboard Interface" with named inventors T. Aebli, B. Miller and W. W. Vetter.

Application Ser. No. 08/703,171 filed 22 Aug. 1996, entitled "Mobile Client Computer Programmed to Predict Input" with named inventors R. L. Bertram, D. F. Champion and P. Brittenham;

Application Ser. No. 08/708,168 filed 22 Aug. 1996, entitled "Mobile Client Computer Programmed to Exchange Lists of Predicted Input" with named inventors R. L. Bertram and W. T. Oldfield;

Application Ser. No. 081/814,034 filed 10 Mar. 1997 entitled "Mobile Client Computer Interacting with Docking Device" with named inventors E. H. Booth, B. A. Carpenter, R. B. Ferrier, R. A. Resnick and W. W. Vetter.

Application Ser. No. 08/706,990 filed 22 Aug. 1996, entitled "Mobile Client Computer Programmed to Copy Lists of Predicted Input" with named inventors R. L. Bertram, P. J. Brittenham and D. F. Champion;

Application Ser. No. 08/813,148 filed 7 Mar. 1997 entitled "Mobile Client Computer Programmed for Systems Message Display" with named inventors R. L. Bertram and D. F. Champion.

Application Ser. No. 08/807,969 filed 3 Mar. 1997 entitled "Mobile Client Computer Programmed to Combine Cursor, Control and Input Functions" with named inventors P. J. Brittenham and L. D. Comerford;

Application Ser. No. 08/813,527 filed 3 Mar. 1997 entitled "Mobile Client Computer Programmed to Display Drop Down Scrolling Indicator" with named inventors R. L. Bertram and D. F. Champion;

Application Ser. No. 08/813,521 filed 7 Mar. 1997 entitled "Mobile Client Computer Programmed to Hide Empty Table Elements" with named inventor R. L. Bertram;

Application Ser. No. 08/700,608 filed 12 Aug. 1996 entitled "Mobile Client Computer Programmed to Display Hexagonal Keyboard" with named inventors R. L. Bertram, D. F. Champion and L. S. Eichorn;

Application Ser. No. 08/700,606 filed 12 Aug. 1996 entitled "Mobile Client Computer Programmed to Establish Soft Keyboard Targeting" with named inventor R. L. Bertram; and Application Ser. No. 08/706,991 filed 22 Aug. 1996 entitled "Mobile Client Computer Programmed to Display Lists and Hexagonal Keyboard" with named inventors R. L. Bertram and D. F. Champion.

BACKGROUND OF THE INVENTION

Personal computer systems in general and IBM personal computers in particular have attained widespread use for providing computer power to many segments of today's modern society. Personal computer systems can usually be defined as a desk top, floor standing, or portable microcomputer that consists of a system unit having a single system processor and associated volatile and non-volatile memory, a display monitor, a keyboard, one or more diskette drives, a fixed disk storage, and an optional printer. One of the distinguishing characteristics of these systems is the use of a motherboard or system planar to electrically connect these components together. These systems are designed primarily to give independent computing power to a single user and are inexpensively priced for purchase by individuals or small businesses. Examples of such personal computer systems are the personal computer systems offered by IBM and identified as the PERSONAL COMPUTER AT, PERSONAL SYSTEM/2, PS/1, Aptiva, and the like. Persons of skill in the computer arts will be familiar with these systems.

These systems can be classified into two general families. The first family, usually referred to as Family I Models, use a bus architecture exemplified by the IBM PERSONAL COMPUTER AT and other "IBM compatible" machines. The second family, referred to as Family II Models, use IBM's MICRO CHANNEL bus architecture exemplified by IBM's PERSONAL SYSTEM/2Models 50 through 95. The Family I models originally used the popular INTEL 8088 or 8086 microprocessor as the system processor. These processors have the ability to address one megabyte of memory. The Family II models typically used the high speed INTEL 80286, 80386, and 80486 microprocessors which can operate in a real mode to emulate the slower speed INTEL 8086 microprocessor or a protected mode which extends the addressing range from 1 megabyte to 4 Gigabytes for some models. In essence, the real mode feature of the 80286, 80386, and 80486 processors provide hardware compatibility with software written for the 8086 and 8088 microprocessors. As the state of the art has progressed, Family I systems have developed toward ever higher capability central processor units, including the Intel PENTIUM brand microprocessor and its competitors, Reduced Instruction Set Computing (RISC) microprocessors such as the IBM and Motorola Power PC processors, and higher capability bus designs such as VESA and PCI bus designs. Again, persons of skill in the computer arts will be familiar with these systems.

The impact of such development on the manner in which computing is done in business and consumer environments has been profound. Prior to the development of personal computer systems, most use of computers was for business purposes only and data processing was done in the "glass house" which housed the computer system. Inquiries were channeled through information managers for handling by computer technicians. With the wide spread use of personal computer systems access to data once maintained on an enterprise wide computer system became important to managers and ultimately line employees. Networks of personal computer systems grew up, with layered access through network servers to the enterprise systems or mainframes on which enterprise data is stored.

As information work has spread to an increasing number of information workers and impacted the work of more wide spread groups of employees within an enterprise, need for mobility of such employees has arisen. Particularly in such "outside" jobs as route salesperson, transport driver, or business consultant, it has become important to have access, while remote from an enterprise site, to enterprise data normally maintained on an enterprise system and accessed through a network of computer systems. Such access has been achieved, in part, through the use of wireline connected personal computer systems such as notebook or laptop computer systems. Typically, such a system may be equipped with a modem and communications software such that, when connected to a public switched telephone network (PSTN), the system may be connected with a supporting server or mainframe and a user may gain access to desired data.

With the development of radio communications such as exemplified by the cellular telephone networks, the possibility arose of eliminating the wireline connection between a personal computer system and a supporting server. Such systems have been developed, particularly for systems used in retail and warehousing businesses, which permit a user to move freely within an area which has radio transceiver service while remaining in intermittent or continuous contact with a data channel through which data may be exchanged with a server or mainframe supporting an enterprise activity. For purposes of discussion here, such systems in the hands of user will be referred to as "mobile client systems". A mobile client system is distinguished by the mobility of the user, who is free of the restraints against movement imposed by a wireline connection, and by the client nature of the system in that enterprise data accessed by the mobile client system is maintained on a server or mainframe computer system with which the mobile client is in communication. Such mobile client systems are also sometimes referred to as personal communications assistants or personal digital assistants. The interested reader is referred to "Wireless: The Revolution in Personal Telecommunications" by Ira Brodsky (Artech House, Boston, 1995) for additional background and information about mobile client systems.

With certain application programs accessed through graphic user interfaces, for example a web browser, document creation may be done by retrieving forms from computer readable data streams, displaying a retrieved form, and entering data to complete or fill fields or cells in the form. Such documents can be presented in windows of varying size. One manner in which this is accomplished includes reflowing the document. Reflowing is an attempt by the application or interface software to maximize the displayed portions of a document while accommodating the available window size. If such a document is a form to be filled or contains a table, reflowing may include narrowing data entry fields or table columns for display in smaller windows while reflowing text within the columns. If the form or table is one originated in a markup language such as HTML, the display will typically include any "empty" cells or fields. As here used, an empty cell or field is one which lacks any character entry which is either title or data information. A table element is a subset of a table, typically having at least one and commonly more than one cell. Table elements are "empty" or "blank" when all cells in the element lack any character entry which is either title or data information. Certain terminology used here is defined more fully hereinafter.

A program which uses small windows, either by choice or because of a small display area being available as in a handheld client system, can ill afford displaying empty cells or fields. The display of an empty cell or table element introduces confusion for a user, in that elements which may contain data of significance may become displaced from the display area by reflowing.

SUMMARY OF THE INVENTION

With the foregoing as background, the present invention contemplates a display system, particularly a computer such as a mobile client system, in which an empty element, cell or field is suppressed from being displayed until called for purposes of entry.

BRIEF DESCRIPTION OF THE DRAWINGS

Some of the purposes of the invention having been stated, others will appear as the following description proceeds, when taken in connection with the accompanying drawings, in which:

FIG. 8 is an illustration of the display screen of the mobile client of FIG. 2 while driven by the execution of an application program on the mobile client to display certain data; FIG. 9 is a view similar to FIG. 8 showing a display of a table having empty elements; and FIG. 10 is a view similar to FIGS. 8 and 9 showing a display in which empty elements are suppressed from being displayed, in accordance with this invention.

DESCRIPTION OF THE PREFERRED EMBODIMENTS

While the present invention will be described more fully hereinafter with reference to the accompanying drawings, in which preferred embodiments of the present invention are shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 1:
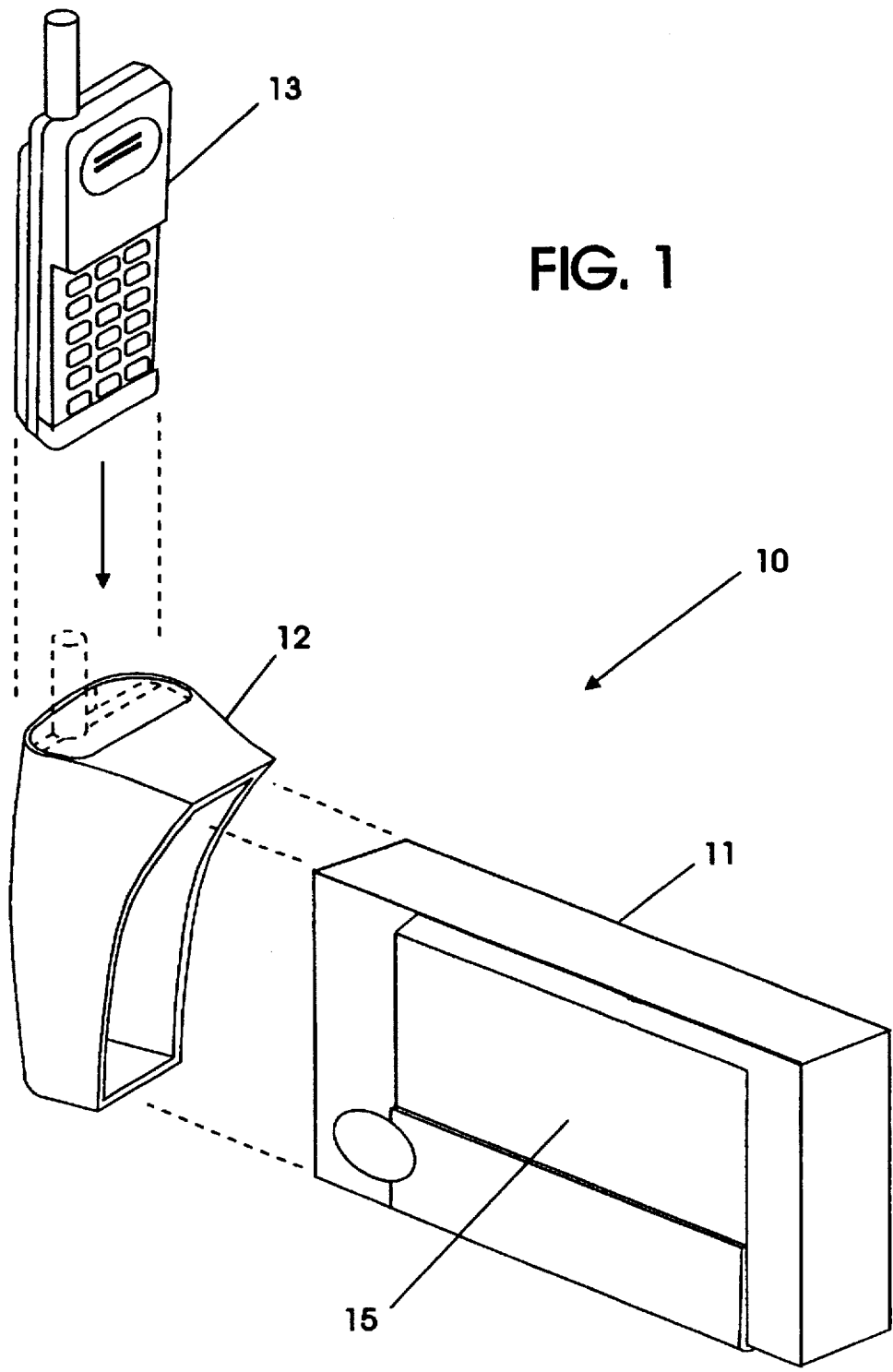
FIG. 1 is an exploded perspective view of certain elements of a mobile client computer system in accordance with this invention.
Figure 2:
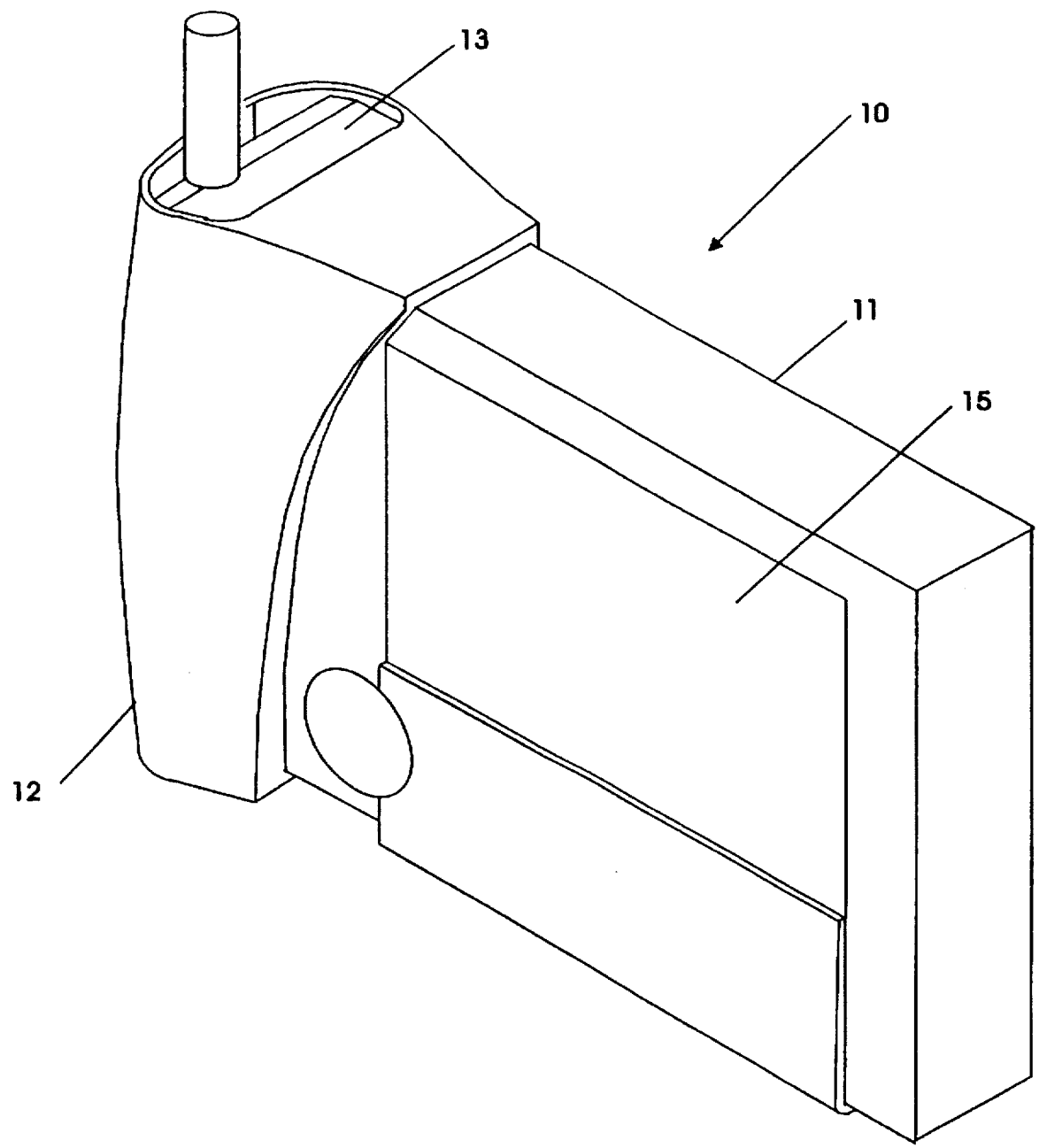
FIG. 2 is a perspective view of the mobile client system of FIG. 1 as assembled for use.

Referring now more particularly to the accompanying Figures, FIGS. 1 and 2 illustrate an exemplary embodiment of a mobile client personal computer system (herein also called a "mobile client") in accordance with this invention and indicated generally at 10. As will become more clear from the description which follows, the mobile client may have a variety of characteristics while remaining within the contemplation of this invention. Central among those characteristics is that the system have provision for the capability of communicating at least data, possibly both data and audio such as voice, between the mobile client system and supporting servers and mainframes. In the illustrated embodiment, such capability is provided by providing a system which is separable into three distinct components, namely a system tablet 11, a holster 12 and a radio transceiver 13. In the form illustrated, the transceiver 13 is a cellular telephone which may be mounted within the holster 12, while the holster 12 may be connected with the system tablet 11 by slipping the tablet into a receptacle provided in the holster 12. While thus illustrated and here described as a three component system, it will be understood that many of the advantages of this invention as described hereinafter can be realized where the mobile client system 10 is unified. That is, where the radio transceiver 13 is integrated with the system tablet 11 and the connection therebetween is accomplished within a single cover for the system, apart from any use of a holster 12. The transceiver/holster/tablet organization provides certain advantages in some circumstances. However, it is to be understood that the invention can be practiced apart from this particular organization.

An advantage realizable with the tripartite organization is the ready substitution of one radio transceiver for another. More particularly, while digital data and analog audio can be exchanged over a cellular telephone radio interface, with data using cellular digital packet data (CDPD) protocols, there are other possibilities. Among them can be digital radio techniques such as frequency division multiple access (FDMA) and time division multiple access (TDMA); spread spectrum technologies such as direct sequence spread spectrum (DS-SS) and resultant code division multiple access (CDMA); frequency hopping spread spectrum (FH-SS); and the combination of one or more of these technologies into what are known as advanced mobile phone systems (AMPS) or advanced radio data information service (ARDIS) or RAM Mobile Data. As these technologies evolve and gain wider acceptance, the tripartite organization will facilitate adapting existing tablets 11 to emerging radio transceivers 13, and thereby protect the investment of users in systems. However, for certain environments such as adverse ambient conditions of temperature, humidity, or exposure to shock as by dropping, a unified system with transceiver and tablet and supporting circuitry in a single cover may be a preferred choice.

Figure 3:
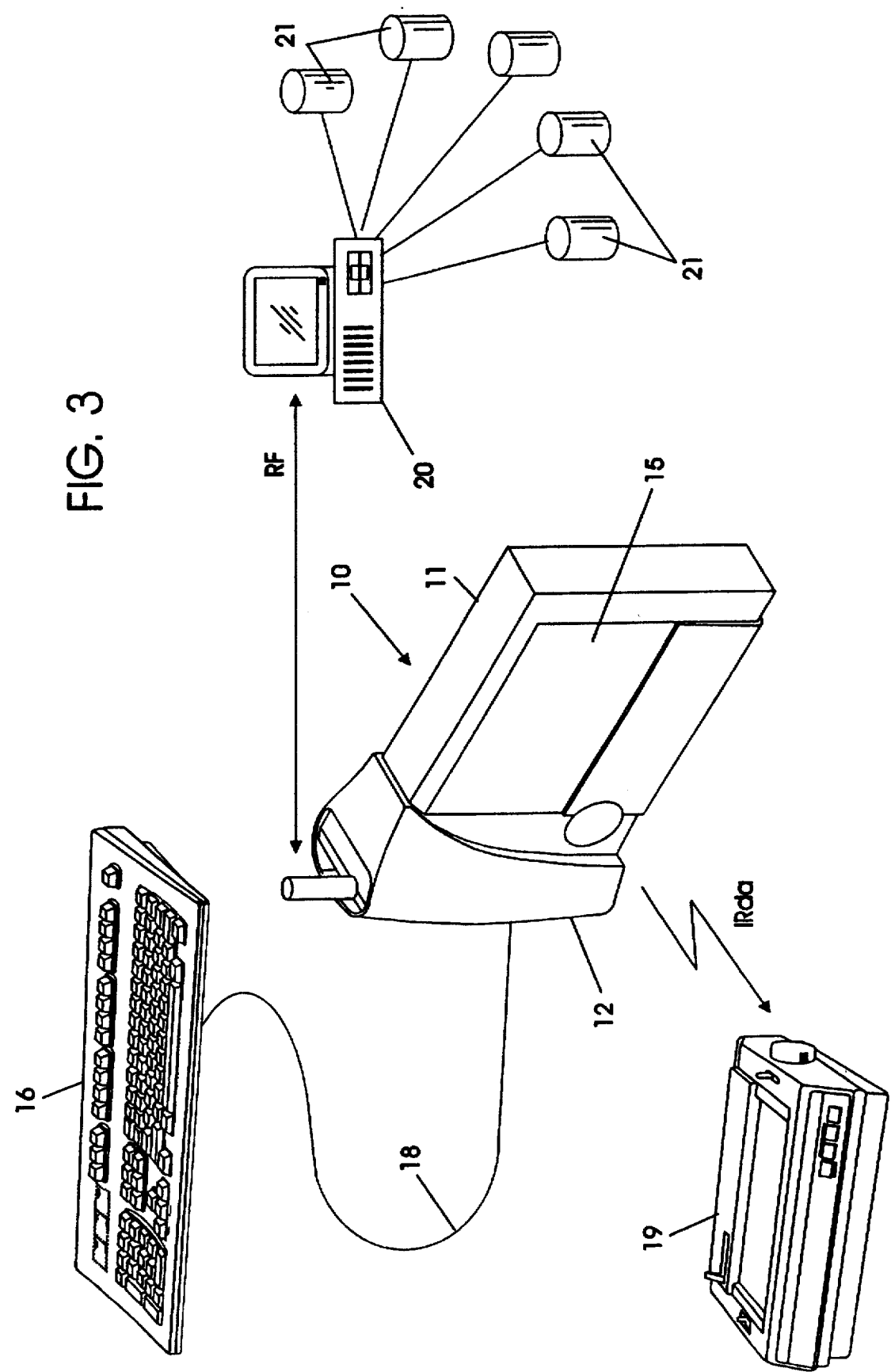
FIG. 3 is a diagrammatic representation of relationships among a mobile client system as shown in FIGS. 1 and 2 and supporting peripherals and systems.

Turning now to FIG. 3, what is there schematically indicated is the relationships among a system 10 in accordance with the invention and supporting servers and peripherals. More particularly, while the tablet 11 (as described more fully hereinafter) is normally adapted for input by a user through a touchscreen 15 embodied in a backlit liquid crystal display, the system 10 can accommodate a more conventional keyboard 16. The keyboard may be, as illustrated, wire tethered to the system 10 when desired for use, with the tethering conductors 18 providing signal pathways for data input to reach the system 10. Alternatively, the keyboard may be linked for data transfer by other means known to persons of skill in the art, such as by an infrared link using a known protocol. In the drawing, the system is shown linked to a printer 19 by an IrDA link for data transfer by infrared radiation.

As indicated above, the radio transceiver provides a radio frequency link to a server indicated at 20, which may communicate by wireline with supporting mainframe data storage 21. Data relevant to the operation of the entire enterprise will be maintained on the supporting mainframe, and made available to the mobile client 10 in accordance with this and the above identified related inventions.

Figure 4:
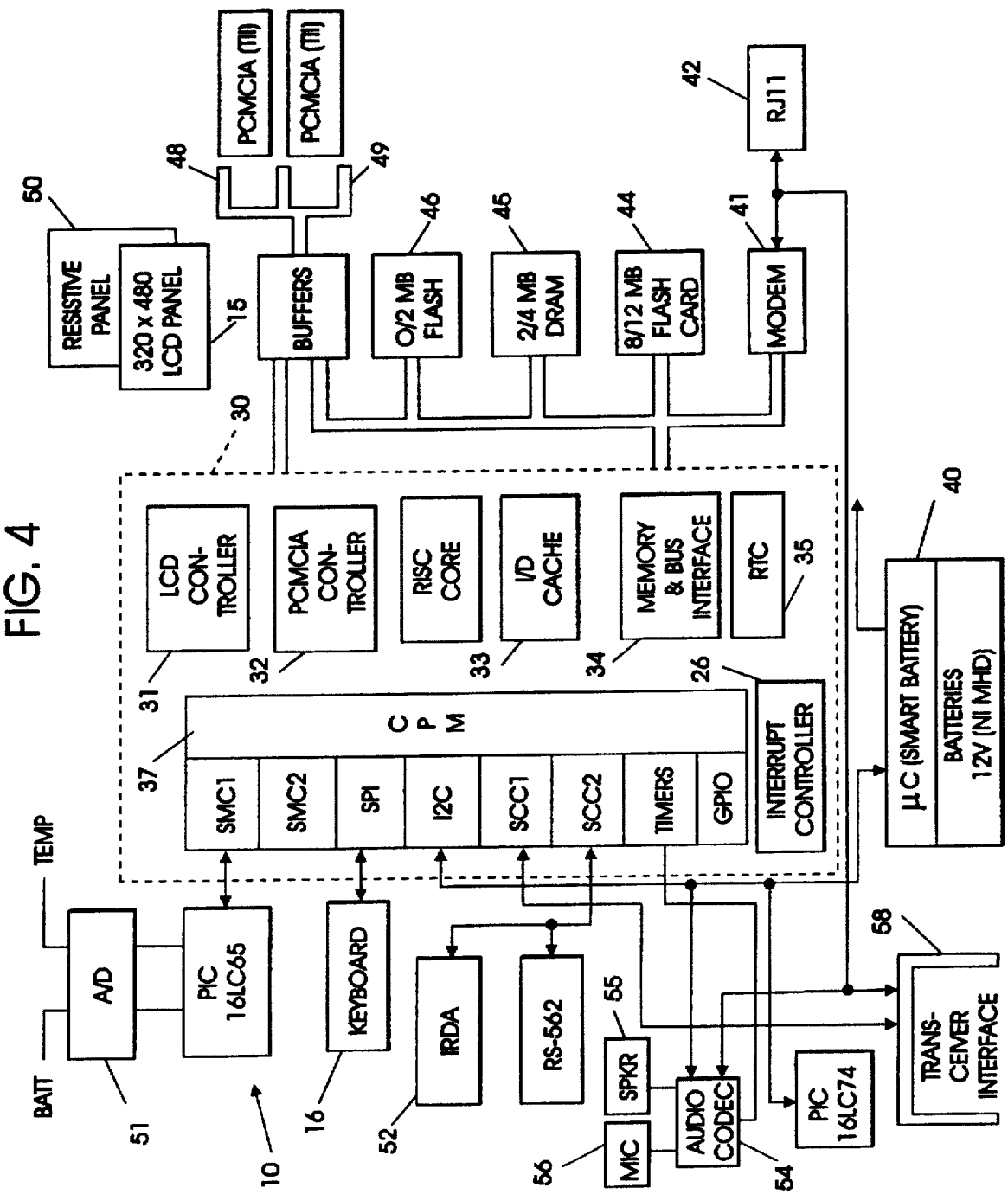
FIG. 4 is a schematic showing of certain circuitry elements embodied in the mobile client of FIG. 2.

Turning now to the circuitry elements which together accomplish the processing of data in accordance with this invention, FIG. 4 illustrates one form of organization of such elements. As there shown, the illustrated mobile client system 10 has at its core a microprocessor (indicated at 30) which uses reduced instruction set computing (RISC) characteristics. The processor has elements which include a controller 31 for a liquid crystal display; a controller 32 for peripherals of the type known as PCCards or PCMCIA cards; instruction/data cache 33; an interface to memory and an external bus 34; and a real time clock 35; The microprocessor also has an interrupt controller 36 and a defined interface for a variety of services 37. While here disclosed as a single processor chip having these characteristics, it is known from the manufacture and use of prior art computer systems that such computational capability and interface availability can be reached by other means, such as the use of an Intel X86 based processor surrounded by appropriate support logic or chips. Thus while the embodiment of FIG. 4 is offered as exemplary of a system in accordance with this invention, it is known the core functionality of such a mobile client system can be otherwise configured.

As indicated in FIG. 4, the core microprocessor 30 is supported by peripherals. Most importantly, power for operating of the system is supplied from a battery 40. Preferably, the battery 40 is of the type known as a "smart" battery, in which provision is made for self monitoring by the battery of charge state and recharge progress. Such batteries are known and will provide signals to the mobile client system processor 30 which can be used to generate indications to a user of the battery charge state, readiness for re-use after charging, etc. The mobile client also preferably has a conventional modem 41, for use when connected by wireline, and a telephone interconnection point 42 (indicated as an RJ-11 connector). Memory for the system is provided by a flash memory accessory card 44.; by dynamic random access memory (DRAM) 45; and by core flash memory 46. Preferably, a pair of PCMCIA slots, of type 11, are provided as shown at 48 and 49 for the addition of other functionality.

In order to display the result of data handling operations performed by the mobile client system, the system 10 has an LCD 15 as mentioned above. The LCD is overlain by a suitable touchscreen 50 which functions as a digitizer to recognize when input is made by a user. There will be further discussion of this functionality later in this description. Input from the touchscreen, as from the battery and a temperature sensor, passes through an analog/digital converter 51 to an input/output (I/O) port of the processor 30. Other I/O ports of the processor 30 provide for connection to a keyboard as described above; an IrDA port 52, an audio CODEC 54 and associated speaker 55 and microphone 56; and an interface connector 58 for the radio transceiver 13.

As was pointed out hereinabove, it is to be understood that the specific organization of functions here described with reference to FIG. 4 may be varied due to a designer's choice of functions to be supported, processor core, and support logic.

As mentioned above, the mobile client system 10 obtains power from a battery. While such operation is appropriate for mobility, provision is made for support of the system 10 by connection to more conventional power sources in the form of alternating current electrical mains. Such power sources are identified at 60 in FIG. 5, to which reference is had in the following description of power management relationships. As will be understood, the management of power usage by a mobile client system is significant with regard to usability of the system.

Figure 5:
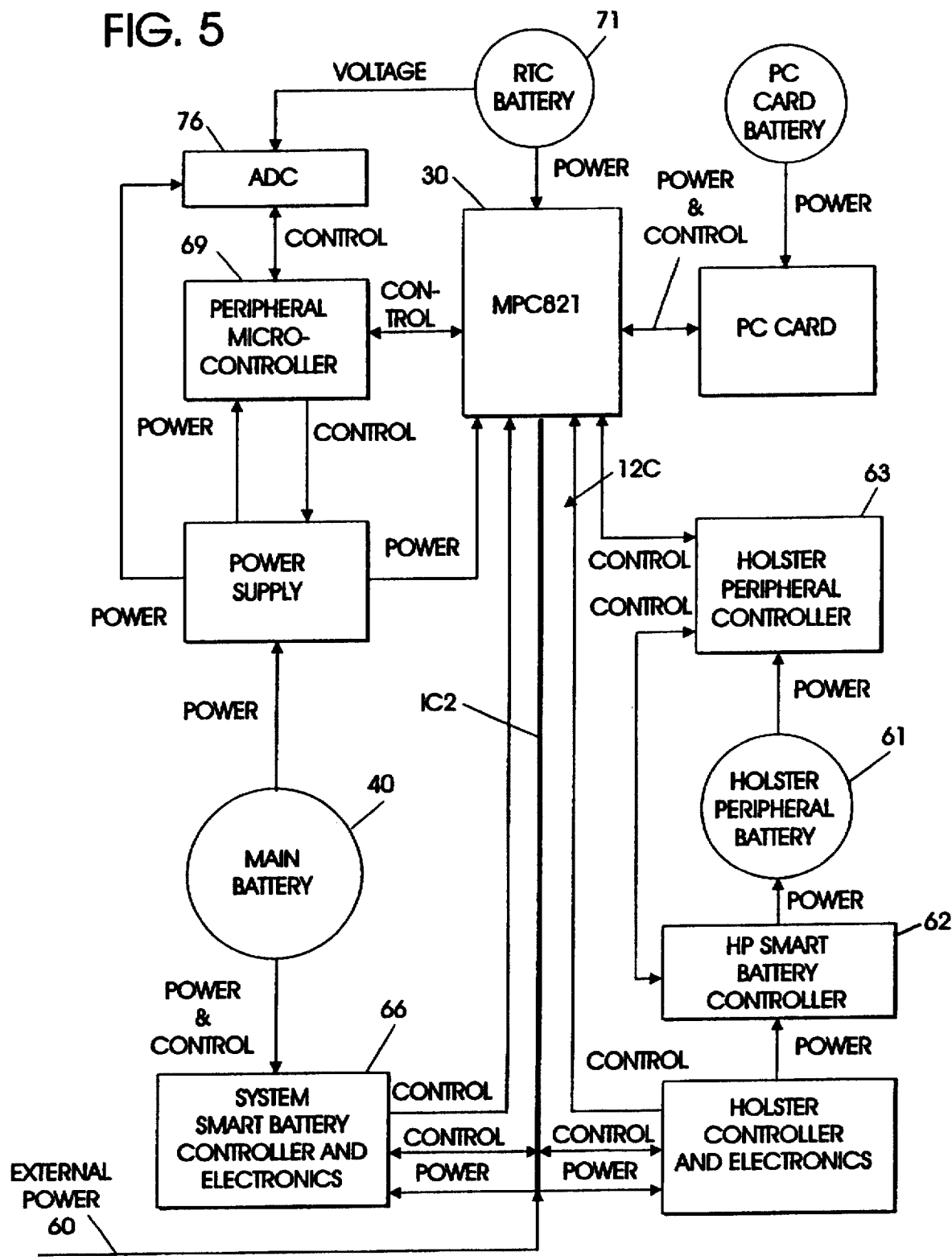
FIG. 5 is a schematic showing of certain circuitry elements and their relationships in the mobile client of FIG. 2.

FIG. 5 illustrates the organization of peripherals around the processor 30 from the perspective of power sources and consumption. The power management topology is such that power flows to the processor 30 in the tablet 11 from the main battery 40, while separate flows of power and control impact the holster 12, any radio transceiver 13 mounted in the holster, and any PCCard accessories used by the system. This division of power flows is of significance to the mobile client system 10 here described. More particularly, a separate battery 61 is provided in the holster 12. The holster battery 61 preferably is a "smart" battery, and has associated therewith in the holster 12 a battery controller 62, a holster peripheral controller 63, and associated circuitry 64 effective to interface the data streams flowing to and from the processor 30 with the radio transceiver 13. Thus, while circuitry in the holster 12 and transceiver 13 is under the control of the processor 30 (as will be pointed out more fully hereinafter), the power source is at least somewhat independent of the tablet 11. This is a significant division. When the tablet is engaged with a holster, the circuitry in the two components cooperates in management of the whole. When a transceiver 13 (which, if a conventional cellular telephone, may have its own power source and power management techniques) is positioned in the holster 12, then the transceiver 13 may also have a coordinated role in participating in power management for the tripartite system.

Turning more particularly to the tablet 11, that system will have controller circuitry 66 for the battery 40 and a power supply 68 to which the battery 40 supplies power for operation of the tablet 11. In the present system, provision is made for a separate microcontroller 69 to exercise control over the power supply in order to off-load certain requirements from the core processor 30. The microcontroller receives input from the processor 30 and from a converter 70. The processor 30 and converter 70 are supported, for minimal functions, by a battery 71 for the real time clock 35. The RTC battery 71 assures that the tablet system will wake up when called as described more fully hereinafter.

Figure 6:
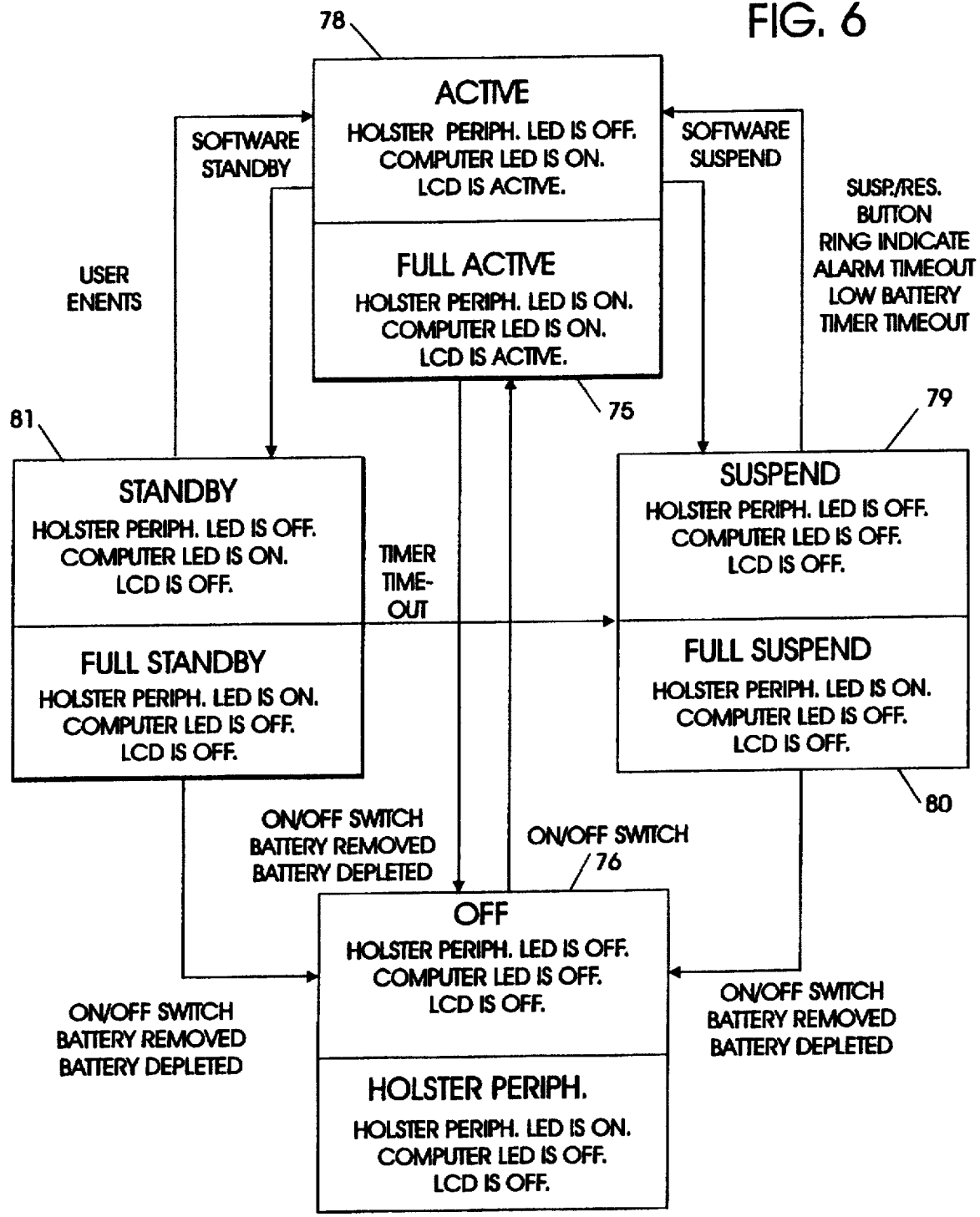
FIG. 6 is a state diagram of power modes for the mobile client of FIG. 2 and transitions among them.

Turning now from the hardware topology to a discussion of the power modes and transition events for the mobile client system 10, FIG. 6 is one illustration of such modalities. For purposes of the following description, it should be noted that a user of the mobile client system will be provided with indicators for the levels of activity of the system. Typically, such indicators or annunciators will be in the form of light emitting diodes (LEDs), as such devices are readily available, inexpensive, and known to most users of technical devices. The tripartite system may be provided with an indicator for the tablet 11, and indicator for the holster 12, and an indicator for the transceiver 13. In FIG. 6, distinctions are drawn between states of activity which reflect differing levels of activity between the tablet 11 and holster 12, and an assumption is made that the system illustrated is a tripartite system with tablet and holster joined.

With this background in mind, the fully active state of the system will have both the tablet 11 and the holster 12 fully activated as indicated by illumination of the corresponding LEDs and the backlit LCD 15. That state is indicated at 75. The completely opposite state, with all components powered down (as if when all batteries have been removed), is indicated at 76, and would result in all LEDs and the backlit LCD being unilluminated. From the state of being fully active, a user may elect to turn off the holster 12, either by operating a switch provided for that purpose or by interrupting a necessary interconnection through separating the holster from the tablet or the radio transceiver from the holster. In such an event, the tablet LED and LCD may remain illuminated (as the tablet remains active) while the holster LED becomes unilluminated (indicated at 78). The mobile client may be capable of data processing using data stored in memory, yet be disconnected (intermittently or temporarily) from the supporting servers 20 and data storage 21. Upon an occurrence determined by software executing on the mobile client system, the system may enter a state known as suspend. In the suspend state, indicated at 79, the tablet LED and LCD and the holster LED are dark. Should it be appropriate for the radio transceiver to be used while the remainder of the tripartite system remains in suspend state, then the system can enter a state indicated at 80 in which the holster LED is illuminated and the transceiver functional. Similarly, upon an occurrence determined once again by software executing on the mobile client system, the system may enter a state known as standby, indicated at 81. In standby, the tablet LCD will be darkened to save power, while the tablet LED will remain illuminated to indicate that the system can be "awakened" readily. The holster may be either powered down (with LED dark) or remain active. A timer function is provided which, after passage of a predetermined time interval with the system 10 in Standby, will transition the system to Suspend mode.

The system can transition between Off state 76 and Active states 78 or 75 by use of an on/off switch. The system can transition from any Suspend or Standby state to Off state 76 by use of the on/off switch or battery removal. The system can transition from Suspend states 79 or 80 to Active states 78 or 75 in response to a suspend/resume input from a user, an incoming call indication from the radio transceiver connected with the holster, time out of a timed interval, or a battery low charge indication from the smart battery controllers. The system can transition from Standby states to Active states 78 or 75 in response to user events such as an input by way of the touchscreen or keyboard.

Figure 7:
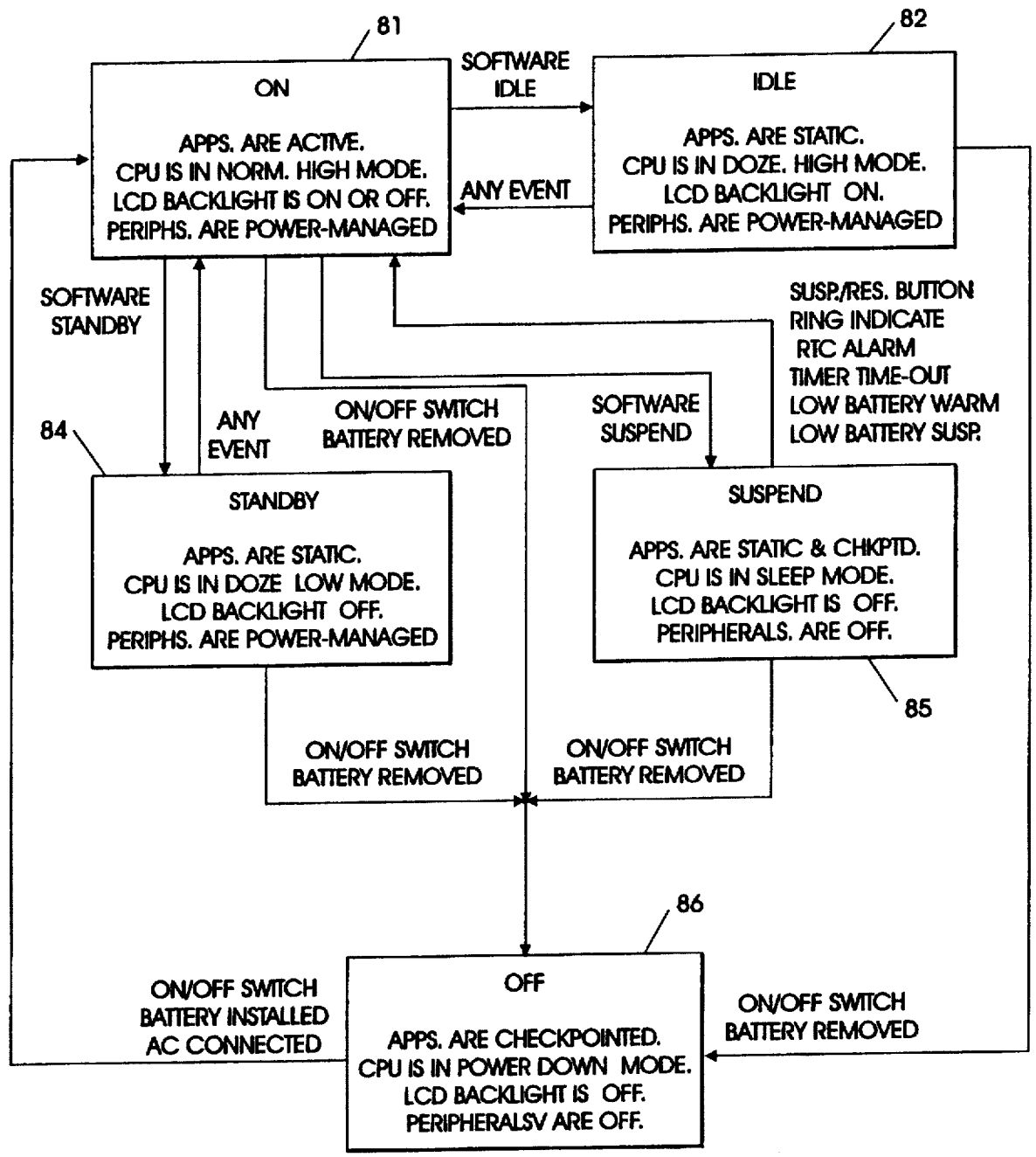
FIG. 7 is a diagram similar to that of FIG. 6 showing the states of certain elements of the mobile client of FIG. 2 and including the status of software executing on the mobile client.

Another view of the power modes and transition events is given in FIG. 7. There, the system states are represented as being an On state 81; Idle state 82; Standby state 84; Suspend state 85; and Off state 86. In the On State 81, the system LEDs and LCD are illuminated, the processor 30 is operating in normal high function mode, application programs are active, and other peripherals are power managed as needed. Passage of time with inactivity will result in the system entering the Idle state 82, in which execution of application programs by the processor has ended, the processor enters a "doze high" mode of power management, the LCD is illuminated, and other peripherals are power managed as needed. Any user event will return the system to the On state. Should the passage of time cause the system to enter the Standby state 84, then application programs become static, the processor enters a "doze low" mode of power management, the LCD is dark, and all other peripherals are power managed as needed. Should the passage of time cause the system to enter the Suspend state 85, application programs become static and are checkpointed for resumption, the processor enters a "sleep" mode of power management, the LCD is darkened, and all other peripherals are off. Thus in terms of time intervals for turnaround to fully active state 81, the system will return most quickly from Idle state 82, less quickly from Standby state 84, less quickly from Suspend state 85, and most slowly from Off state 86.

Figure 8:
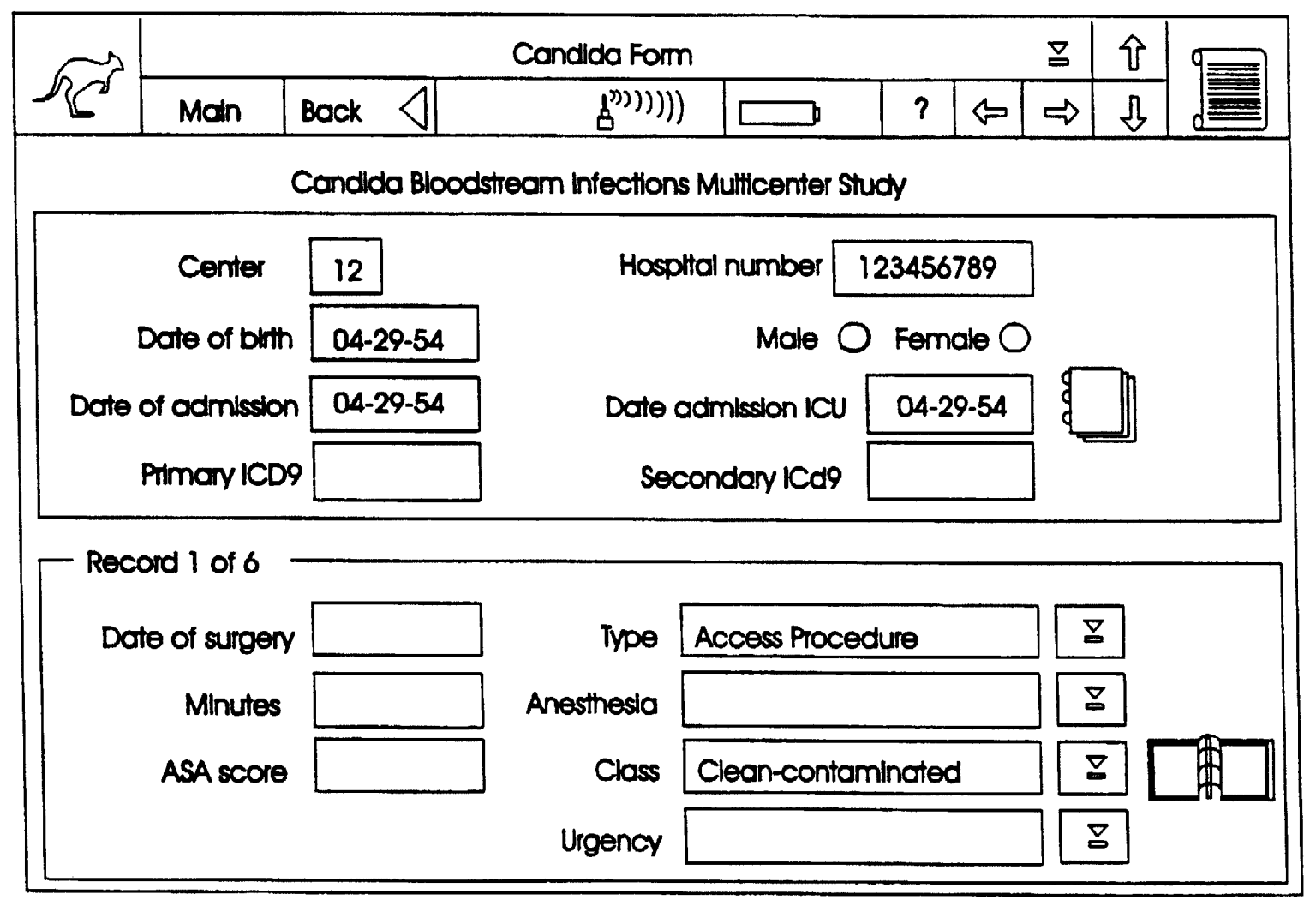

It is now believed instructive to address briefly the display and communication of data as contemplated for the mobile client system of this invention. Referring now more particularly to FIG. 8, there is shown there an exemplary representation of a display screen for an application program executed on the system 10. Preferably, the system 10 executes an application program in the nature of a browser program as used for connection by HyperText Transfer Protocol (HTTP) and for files in HyperText Markup Language (HTML). HTTP and HTML have come into wide use in the environment known as the internet or world wide web. These technologies are here used to facilitate operation of the mobile client system with minimal resources in the client and maximum use of resources available through the supporting server and mainframe data storage.

More particularly, the processor 30 of the client system executes an operating system program and a browser program stored in the system flash memory 46. In executing these programs, the system exchanges data with a supporting server by passing data through the radio link provided by the transceiver 13 and interface 58 or the modem 41 if then wire connected. Data so exchanged may be stored for manipulation by the operating system and browser in the system DRAM memory 45. The browser, in conjunction with the data obtained from the supporting server, will display on the LCD 15 a screen which may, for example, appear as shown in FIG. 8. The screen there shown has a title bar 90 across the upper limit of the displayed field and, within the displayed field, a form having defined fields for data such as identifying numerals or names. In the specific form illustrated, the fields include a field for a center number, a hospital number, dates of birth and admission of the identified patient, and the like. Adjacent the title bar 90 is a representation of an animal, shown at 91 and here illustrated as a kangaroo. This representation is used, in accordance with certain implementations of this invention, to indicate that the system is "jumping" from one data access to another and that a user should await completion of the "jump". There are also provided, immediately below the title bar 90, indications of function "buttons" such as return to the main (or initial) screen, go back one screen, exchange data by wireless link, battery charge state, and navigation about the screen presented. Certain fields, such as the Date of Admission to the ICU and the Class fields, may be annotated by a user, and are so indicated by the positioning adjacent those fields of a "notebook" icon. The notebook may be either closed (as adjacent the Date of Admission field) suggesting that it presently lacks any annotation, or opened (as adjacent the Class field) suggesting that it presently contains an annotation.

Inasmuch as the mobile client system 10 has a touch-screen 50 which overlies the LCD 15, input of data into the system can be accomplished by a stylus, pointer or finger applied to fields of the touchscreen. Thus, referring to FIG. 8, should a user desire to input information identifying the gender of a particular patient, the user could touch (with stylus, pointer or finger) the buttons "male" or "female" to enter that data. Similarly, should a user wish to enter an annotation, the user could touch the field defined by the notebook icon to change the icon between the closed and open states and thereby open a field for entry of appropriate numerical or alphabetic data.

Other and further functions of the applications program and the screen display will become more clear from discussion which follows or appears in the above identified related applications.

Some embodiments of the present invention pertain particularly to the display of tables that consist of repeating subsets or elements of cells containing data information. For example, the table displayed in a window in FIG. 9 gathers data for up to six instances of surgery.

In implementing this invention, the author of the form must specify the element size of the table, in rows and columns, and the offset of the first element. In this case, the basic table "element" is one column from side-to-side or wide (First, Second, etc.) by three rows from top-to-bottom or high (Date, Minutes, Type, Class). The first element starts at an offset of one column and one row, since cells in the first column and the first row are headers. As used herein, a header is a cell which contains title information, typically a text identification giving meaning to data information which appears in referenced cells arranged in columns and rows. The cells, or column and row location of information, are defined as being for title information or for data information (as more fully shown in FIG. 10). A basic table element consists of a number of cells necessary to accommodate a complete display of an organized portion of the total tabular information or display, as determined by the header organization.

The user will normally use the table elements in order. For example, the user would never use the "Third" element without first completing the "First" and "Second" elements. The patient cannot have surgery for a third time without having surgery for a first and second time. Hence, the user never needs more than one empty or blank column. Accordingly, the embodiment of this invention here being described hides all of the empty or blank table elements except for the "next one". If columns one through three contain data, then the browser shows the three columns with data plus the fourth column that is blank, as in FIG. 10, rather than the full blank table as in FIG. 9.

In a preferred implementation of this invention, when the fourth table element receives data, the fifth element will appear. There are three ways in the application program or browser can add the next empty element. First, the display may be refreshed so that the next blank element may appear as soon as the user begins entering data in the existing blank element. This requires a high level of interaction between the browser and the user which most HTML browsers do not currently support. Second, the next blank element may appear in response to a user request, such as pushing a button. With this method, it is not necessary to show any blank elements until requested. The user cannot add more elements than the form supports since the browser is only revealing the existing elements, not creating them. Third, the next blank element may appear the next time the browser loads the form. The user can get more than one new element at a time by using the browser's "reload" feature.

Figure 9:
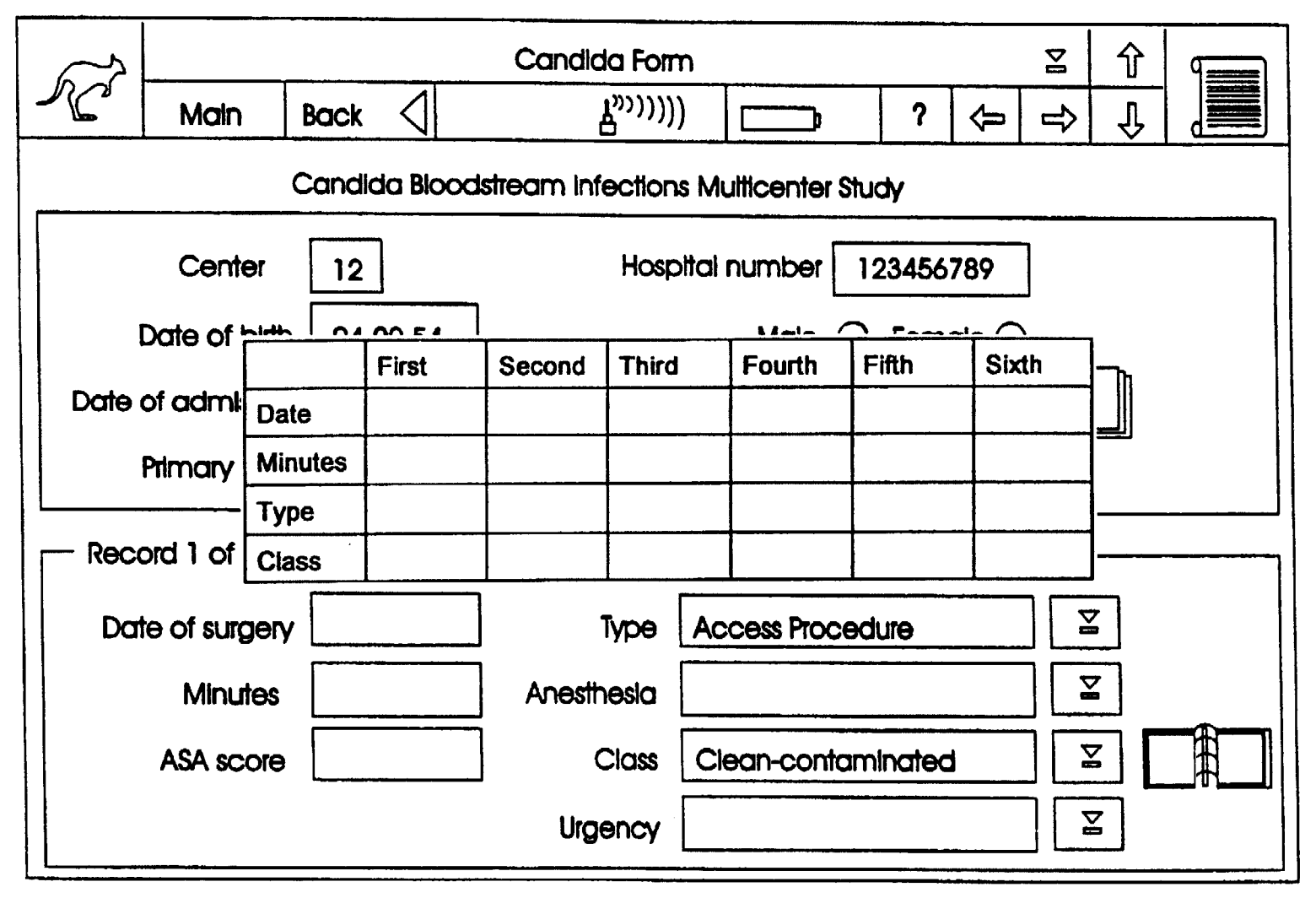

If a browser without this invention displays the same form, then all of the empty elements appear as before and as in FIG. 9. One advantage of this invention is that the enhanced form still works with browsers that do not embody the invention.

In the drawings and specifications there has been set forth a preferred embodiment of the invention and, although specific terms are used, the description thus given uses terminology in a generic and descriptive sense only and not for purposes of limitation.

What is claimed is:

1. A mobile client computer comprising:

a housing sized to be held in and manipulated by the hand of a user;

a processor mounted within said housing and processing digital data;

memory mounted within said housing for storing digital data and coupled to said processor;

a display mounted in said housing and coupled to said processor and said memory to display information derived from digital data processed by said processor;

an input digitizer mounted in said housing and overlaying said display, said digitizer being coupled to said processor and enabling input of digital data by a user; and a control program stored in said memory and accessible by said processor to direct the processing of digital data by said processor;

said control program and said processor cooperating, when said control program is executing on said processor, in (1) displaying tables having a plurality of cells organized in table elements, (2) displaying one empty table element, and (3) suppressing display of any remaining table elements which are empty.

2. A mobile client computer according to claim 1 wherein each of said table elements has a single cell.

3. A mobile client computer according to claim 1 wherein each of said table elements has a plurality of cells.

4. A mobile client computer according to claim 1 wherein said control program and said processor cooperate, upon entry of data into a cell of a displayed empty table element, to add to the display a next adjacent empty table element.

5. A mobile client computer according to claim 4 wherein said control program and said processor cooperate to add said next adjacent table element to the display upon user request.

6. A mobile client computer according to claim 4 wherein said control program and said processor cooperate to add said next adjacent table element to the display upon the next subsequent opening of the table display.

7. A computer comprising:

a housing;

a processor mounted within said housing and processing digital data;

memory mounted within said housing for storing digital data and coupled to said processor;

a display coupled to said processor and said memory to display information derived from digital data processed by said processor; and a control program stored in said memory and accessible by said processor to direct the processing of digital data by said processor;

said control program and said processor cooperating, when said control program is executing on said processor, in (1) displaying tables having a plurality of cells organized in table elements, (2) displaying one empty table element, and (3) suppressing display of any remaining table elements which are empty.

8. A computer according to claim 7 wherein each of said table elements has a single cell.

9. A computer according to claim 7 wherein each of said table elements has a plurality of cells.

10. A computer according to claim 7 wherein said control program and said processor cooperate, upon entry of data into a cell of a displayed empty table element, to add to the display a next adjacent empty table element.

11. A computer according to claim 10 wherein said control program and said processor cooperate to add said next adjacent table element to the display upon user request.

12. A computer according to claim 10 wherein said control program and said processor cooperate to add said next adjacent table element to the display upon the next subsequent opening of the table display.

13. A display generating system comprising:

a housing;

a processor mounted within said housing and processing digital data;

memory mounted within said housing for storing digital data and coupled to said processor;

said processor and said memory cooperating in supplying digital data driving a display of visual images; and a control program stored in said memory and accessible by said processor to direct the processing of digital data by said processor;

said control program and said processor cooperating, when said control program is executing on said processor, in (1) displaying tables having a plurality of cells organized in table elements, (2) displaying one empty table element, and (3) suppressing display of any remaining table elements which are empty.

14. A system according to claim 13 wherein each of said table elements has a single cell.

15. A system according to claim 13 wherein each of said table elements has a plurality of cells.

16. A system according to claim 13 wherein said control program and said processor cooperate, upon entry of data into a cell of a displayed empty table element, to add to the display a next adjacent empty table element.

17. A system according to claim 16 wherein said control program and said processor cooperate to add said next adjacent table element to the display upon user request.

18. A system according to claim 16 wherein said control program and said processor cooperate to add said next adjacent table element to the display upon the next subsequent opening of the table display.

* * * * *